Nov. 13, 1928.　　　　　J. A. FURNESS　　　　　1,691,651

VARIABLE SPEED GEAR

Filed Dec. 19, 1927　　　6 Sheets-Sheet 1

J. A. Furness
INVENTOR

By: Marks & Clerk
Attys.

Nov. 13, 1928.

J. A. FURNESS 1,691,651

VARIABLE SPEED GEAR

Filed Dec. 19, 1927    6 Sheets-Sheet 2

J. A. Furness
INVENTOR

By: Marks & Clark
Attys.

Patented Nov. 13, 1928.

1,691,651

UNITED STATES PATENT OFFICE.

JOHN ALGERTON FURNESS, OF BROMLEY, ENGLAND.

VARIABLE-SPEED GEAR.

Application filed December 19, 1927, Serial No. 241,188, and in Great Britain December 23, 1926.

This invention relates to variable speed gears of the epicyclic type.

One object of the present invention is to provide an improved mechanism for selecting the gear giving the desired transmission ratio.

According to the invention the selector member capable of linear motion is furnished with a plurality of cams or projections which according to the position in which the member is brought by means of a hand lever or the like are arranged to operate one or other of a plurality of brake members while with the selector member a spring adapted to constrain the said member to move about its axis in order to secure engagement of the clutches or the operation of the brakes, as the case may be, and a foot lever adapted to move the said member about its axis in opposition to the spring are associated and further in addition to brake members for securing a drive through one or other of the trains a clutch is provided for securing a direct drive in high gear the selector member being arranged to secure, when moved into a given position, the engagement of this clutch.

With a device of this character, in changing gear the pedal lever will be depressed, thereby releasing the driving connection between the engine or primary shaft and the driven shaft after which the selector member may be moved into the position in which by release of the pressure upon the foot pedal it will ensure a drive at the desired transmission ratio.

The constructions in accordance with the present invention are particularly adapted for use in association with epicyclic gears as claimed in application for Letters Patent Serial No. 161,185.

The brakes are conveniently of the external contracting type but brakes of the internal expanding type may be employed in accordance with the invention.

It is further to be observed that brakes in accordance with the invention may be employed otherwise than in association with variable speed gears without exceeding the scope of the present application.

Certain constructions in accordance with the invention are illustrated by way of example in the accompanying drawings, in which:—

Figure 4:
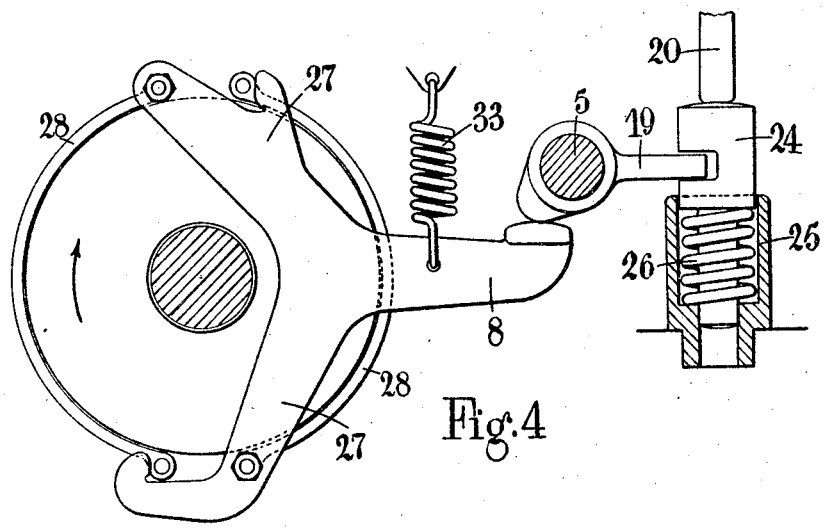
Figure 5:
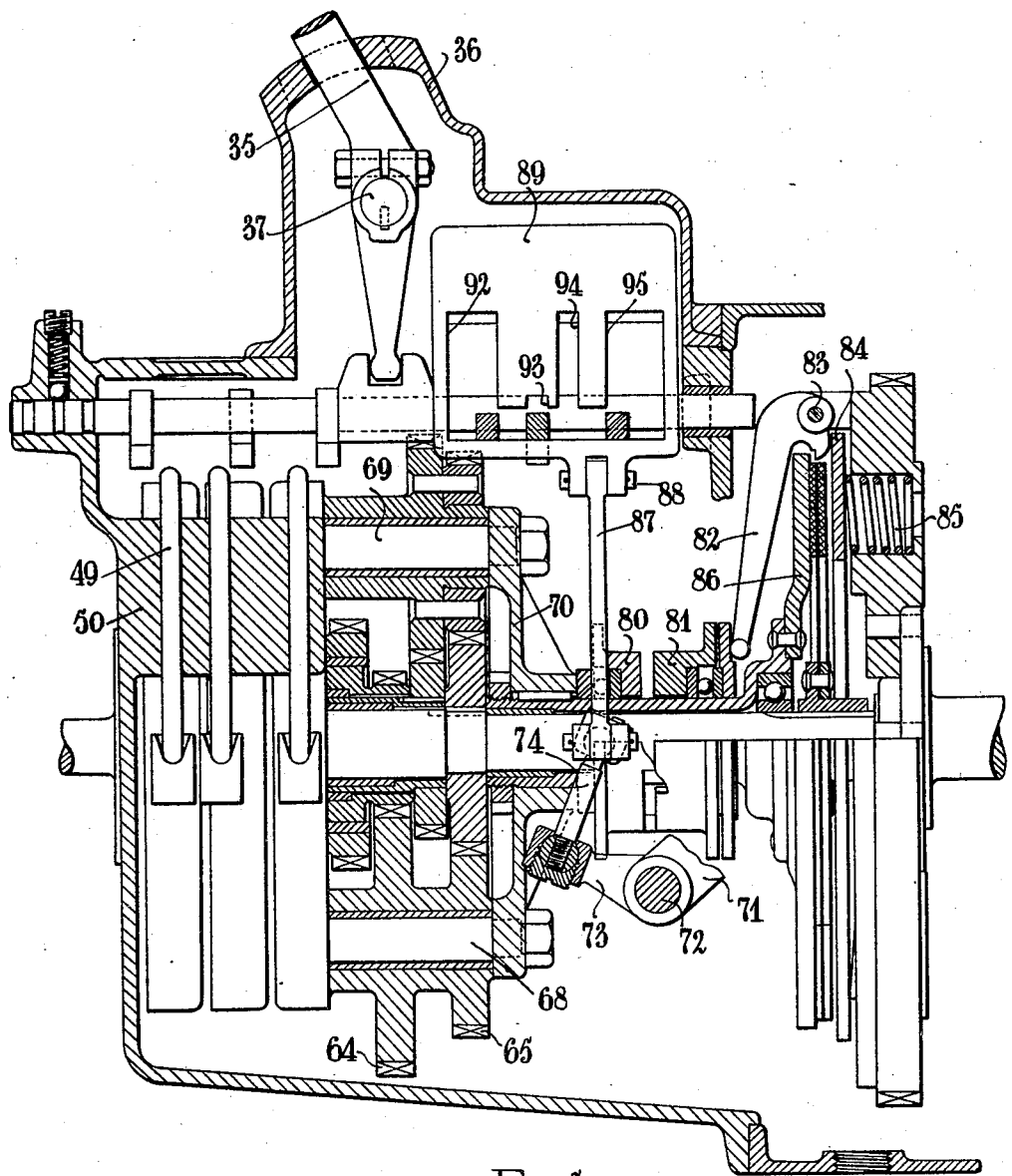
Figure 6:
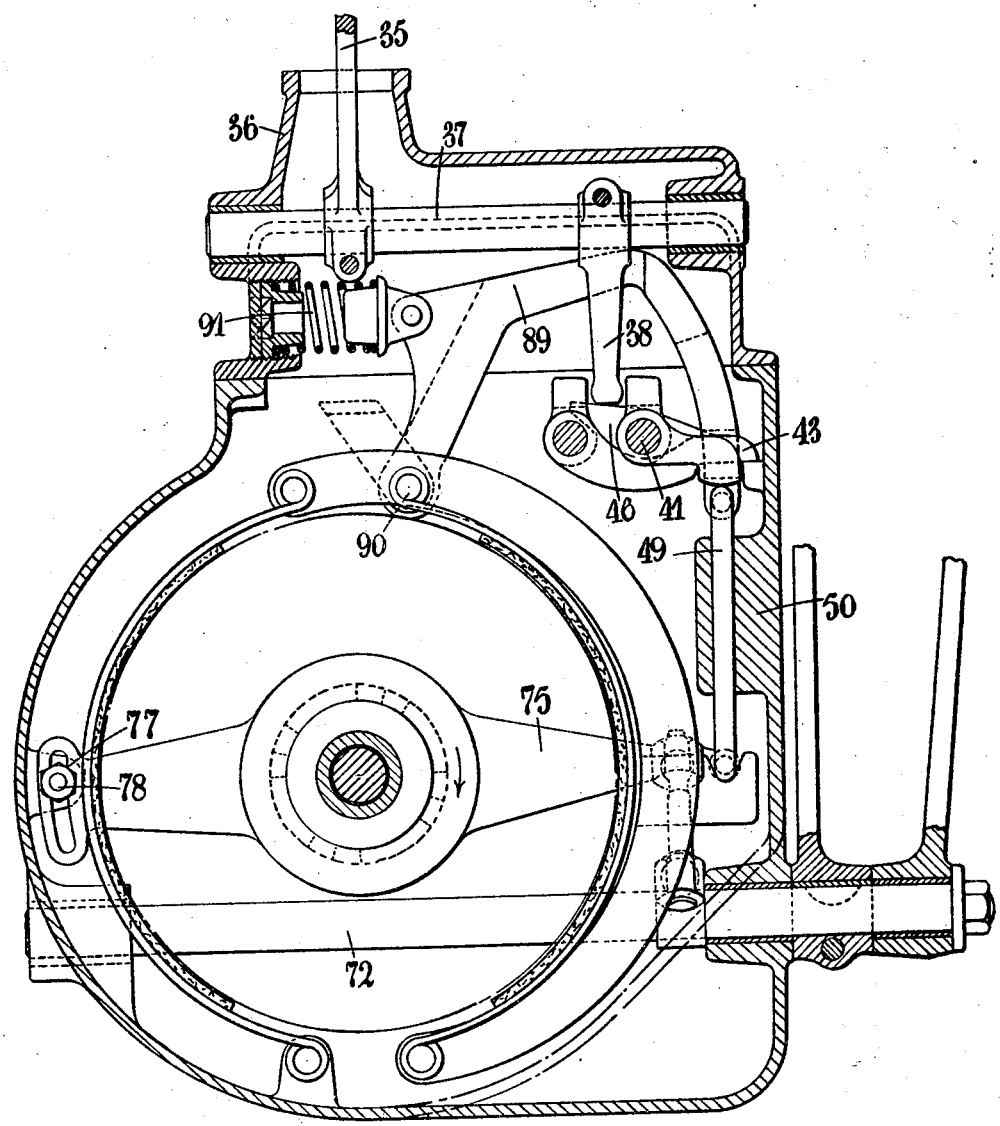
Figure 7:
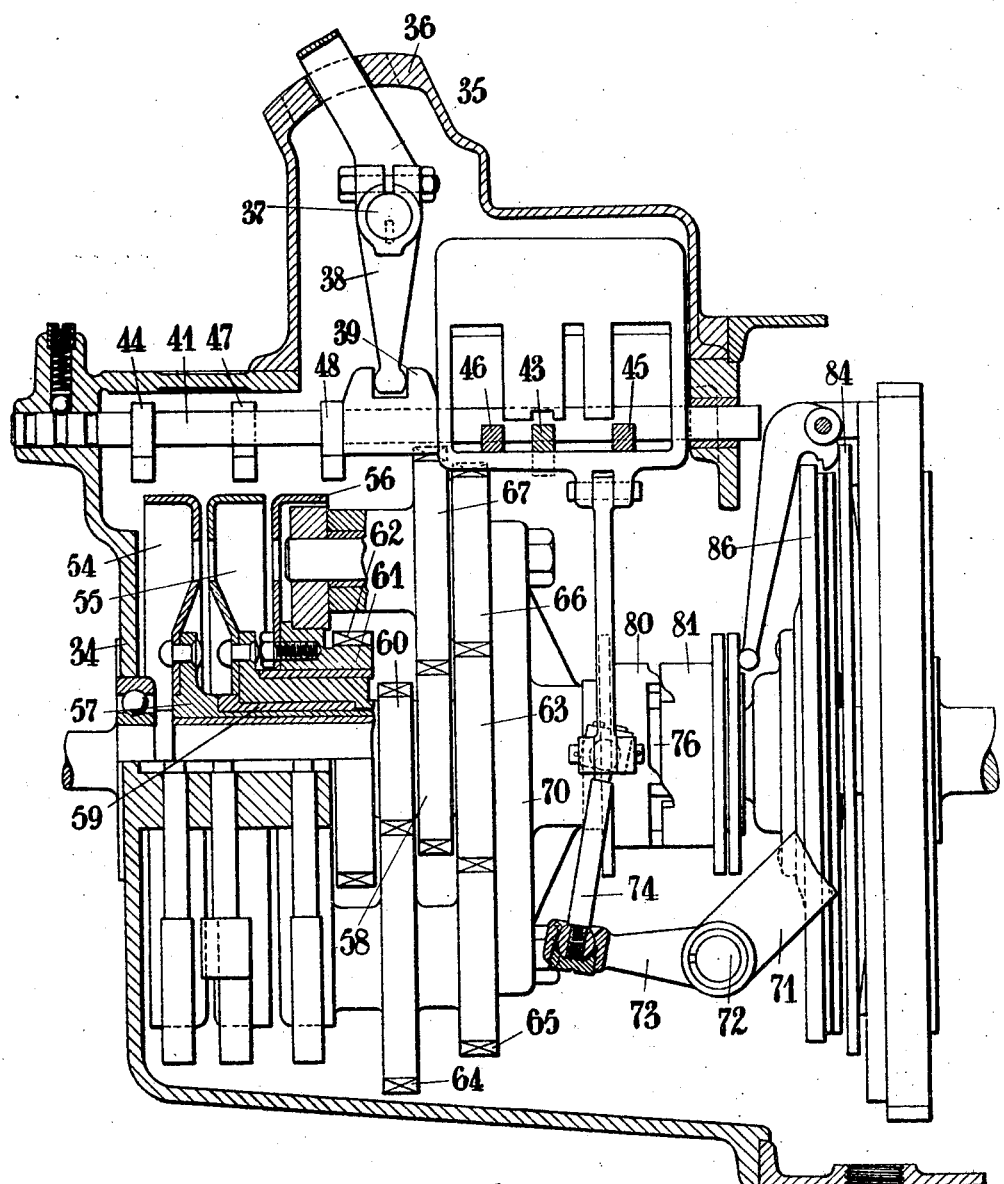

Figure 4 being a detail view on a larger scale showing certain features of a slightly modified construction, while Figure 5 is a longitudinal section of another construction of variable speed gear and selector mechanism in accordance with the invention, Figure 6 being a cross section, while Figure 7 is a longitudinal elevation partly in section showing more particularly the construction of the brake drums.

Figure 8:
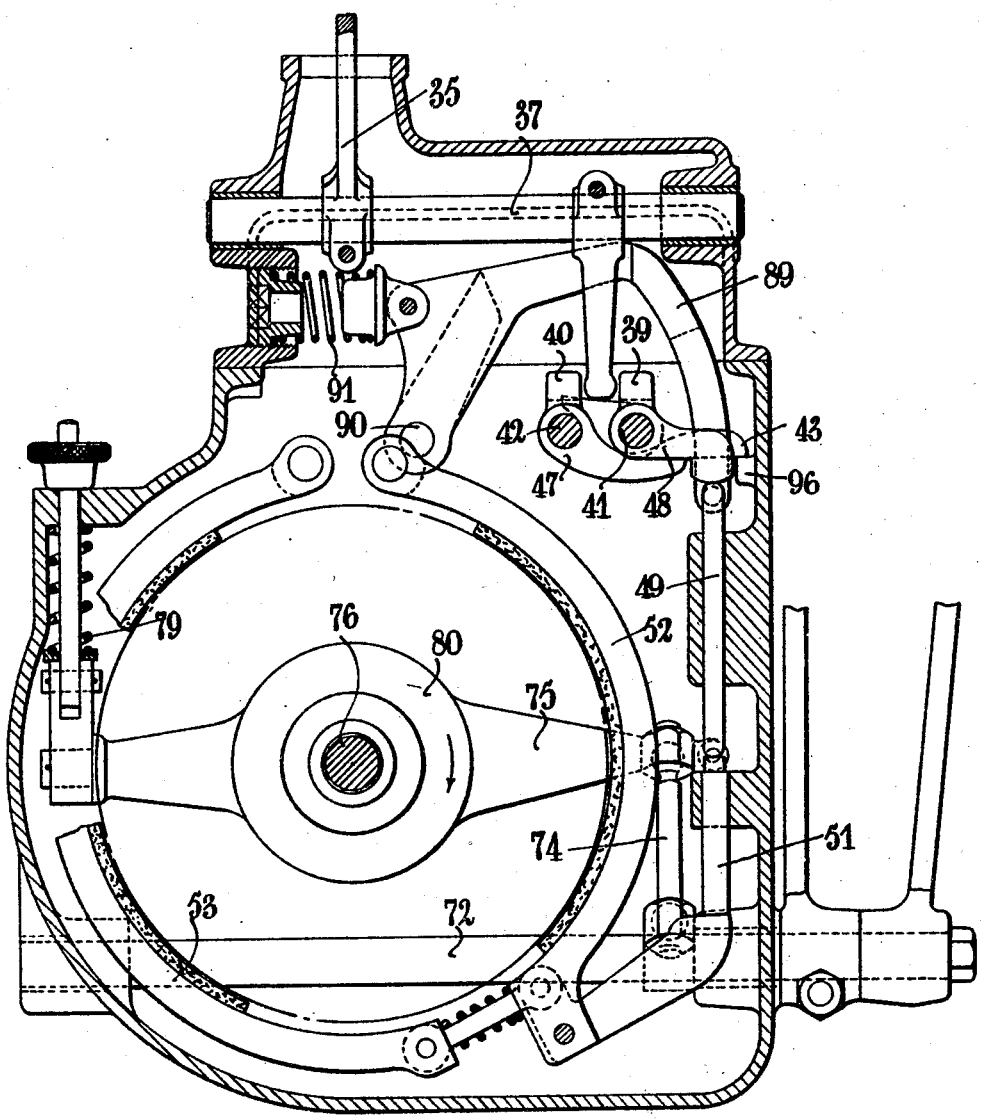

Figure 8 is a transverse section of a third construction distinguished from the construction in Figures 5 to 7 in respect of the brake mechanism.

Referring to Figures 1 to 4; 1 is the gear lever, 2 the gate adapted to limit the motion of the same, 3 is an extension from the gear lever engaged between flanges 4 on the shaft 5 which is arranged in suitable bearings so as to be capable of axial motion under the action of the gear lever. On this shaft are provided two cams 6 and 7.

Figure 1:
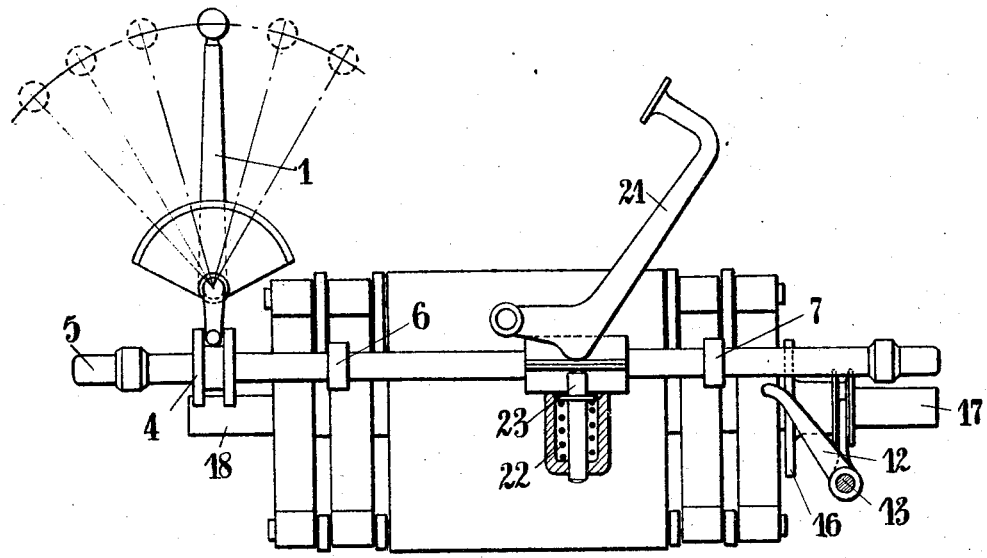
Figure 1 is a side elevation of one construction of variable speed gear and selector mechanism in accordance with the invention.
Figure 2:
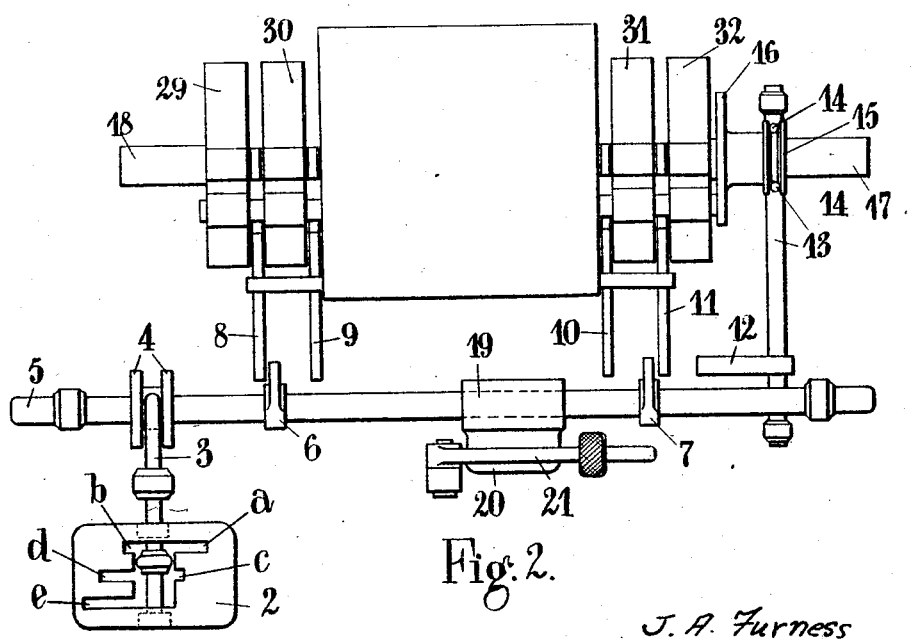
Figure 2 is a plan.
Figure 3:
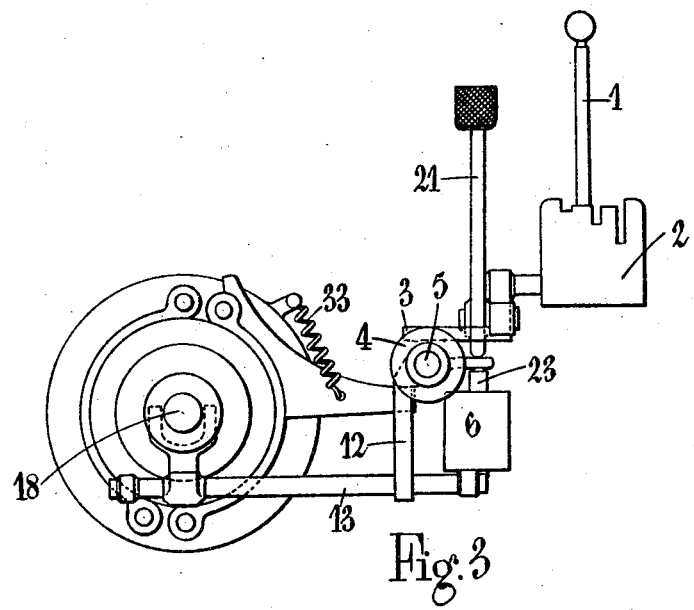
Figure 3 is an end elevation thereof.

By appropriate motion of the gear lever the cam 6 may be brought over the lever 8 or the lever 9 or be moved into a position in which it will contact with neither of these levers, while the cam 7 by appropriate motion of the gear lever may be brought over the lever 10 or the lever 11 or the lever 12, which latter is mounted on the shaft 13 furnished with a fork 14 engaging the flanged collar 15 of the clutch element 16 which is arranged to co-operate with a clutch element whereby the driving shaft 17 will be locked directly to the transmission shaft 18 thus enabling a direct drive on top gear to be secured. For imparting rotational motion to the shaft 5 a member 19 is secured to the shaft, this member being provided with a projection 20 which is adapted to be operated by the pedal 21 and moved by the pedal, as shown in Figure 1, in opposition to the spring 22 located about the slidably mounted pin 23.

In Figure 4 the member 19 is shown engaged in a slot in a member 24 slidably mounted in a socket 25 in which is located a spring 26, while the heel of the clutch 20 is arranged to bear on the head of the member 24 in order to move it when desired in opposition to the spring. The levers 8, 9, 10 and 11 are of the form shown in Figure 4, each being provided with two arms 27 to which are pivoted brake shoes 28 adapted to be brought to bear upon the brake drums, of which there are four, 29, 30, 31 and 32 in the construction illustrated. With the levers springs 33 are associated adapted to release the brakes from the drums. In the operation of the constructions illustrated in Figures 1 to 4 on the depression of the clutch pedal 21 the selector shaft will be rotated about its axis and under the action of the hand lever 1 the selector shaft may be moved axially to a greater or less extent in a forward or rearward direction. For instance, if the gear lever is moved so that it enters the slot $a$ in the gate the cam 7 will be brought over the lever 10 and on releasing the clutch pedal brakes will be applied to the drum 31 in order to give, for instance, a drive in reverse. If the lever is moved into the slot $b$ the cam 7 will be brought over the lever 11 and when the clutch is released brakes will be applied to the drum 32 giving, for instance, the first forward speed. In moving the gear lever out of this slot laterally and in a forward direction into the slot $c$ the cam 6 will be brought above the lever 8 and on releasing the clutch brakes will be applied to the drum 29 for giving the second forward speed, while on moving the lever into the slot $d$ in the gate the cam 6 will be brought above the lever 9 and in this way, on releasing the clutch pedal, brakes will be applied to the drum 30 for securing the drive at the third speed. By moving the lever out of the slot $d$ after depressing the clutch pedal and into the slot $e$ the cam 7 will be brought into position to engage with the lever 12 when the clutch pedal is released and in this way a direct drive on top will be secured owing to the clutch element 16 engaging a correspondingly formed clutch element.

Referring to Figures 5, 6, 7 and 8, 34 is the gear case, 35 is the gear lever operating in the gate 36. The gear lever is secured to a spindle 37 on which also the lever 38 is secured. By axial motion of the spindle 37 the lever 38 may be caused to engage between the projections 39 or corresponding projections 40 respectively on the slidably mounted spindles 41 and 42, one of which is provided with a finger 43 and a cam 47, while the other is provided with two fingers 45 and 46 and cams 44 and 48. These cams are adapted by rotation of the spindle 41 to be caused to bear upon one or other of a plurality of rods, indicated by the reference 49, slidably mounted in the guide 50 forming part of the gear case. By the depression of these rods directly as indicated in the constructions shown in Figures 5 to 7 and through the intermediary of the slidably mounted rod 51 in the construction illustrated in Figure 8 one or other of the pairs of brake shoes 52, 53 will be brought to bear upon the brake drums 54, 55 and 56 with which they are associated. The drum 54 is secured to a sleeve 57 on which a sun wheel 58 is secured, the drum 55 being connected by the sleeve 59 with a sun wheel 60 and the drum 56 is connected to the sleeve 61 which is formed as a sun wheel 62. These several sun wheels, as well as the sun wheel 63, engage planet wheels 64, 65, 66 and 67 secured respectively by the spindles 68, 69 to the plate 70.

A pedal 71 rotatably mounted on the spindle 72 and rigid with the lever 73 is connected by a ball-ended connecting rod 74 with the member 75 rotatably mounted on the engine shaft 76. The degree of rotary motion imparted to this member is limited by the slot 77 engaging the bolt 78 in the construction illustrated in Figure 6 and by the operation of the pedal this member can be moved in opposition to the spring 79. One face of the member is formed as a dog clutch element 80 and when it is rotated on depressing the pedal the teeth of this element riding over the teeth of the corresponding element 81, which is slidably mounted on the driving shaft, will force the latter against the ends of a plurality of levers, of which only one 82 can be seen, pivoted at 83, thereby forcing the friction clutch member 84 in opposition to the springs 85 out of engagement with the clutch member 86. At the same time the connecting rod 74 raises the rod 87 which is pivotally connected by the pin 88 with the locking plate 89 moving it about its pivot 90 in opposition to the spring 91. The locking plate, as will be observed, is provided with a plurality of slots 92, 93, 94 and 95, and when raised the selector rods 41 may be freely moved by the gear lever to bring one or other of the projections 43, 45 or 46 into register with the slots or with the elevated portions intervening between the aforesaid slots and if brought into register with an elevated portion, on releasing the clutch pedal, the locking plate will rotate the selector rod thereby causing the cam or finger of the same to operate through one of the rods 49 upon one of the brake elements thereby causing one or other of the gears to be engaged.

In the position illustrated in the drawings the finger 43 is under the slot 93 in the locking plate, the locking plate being in a raised position. On releasing the locking plate the finger will enter this slot and the dog clutch member 80 will rotate to a certain extent about the driving shaft but it will not rotate to an extent sufficient to permit the clutch element 86 to engage the clutch element 85. The finger 43, moreover, in this position will rest on the lug 96 and when the several elements are in this position the gear will be in "neutral". If, on the other hand, the finger 43 is in the slot 94 and out of register with the lug 96, the other fingers being in the position illustrated in the drawings, the locking plate will move down under the action of its spring and will rotate the dog clutch member 80 relatively to the dog clutch member 81 and will permit the clutch elements 84 and 86 to engage, thus providing a direct drive in high gear.

Having now described my invention, what I claim as new and desire to secure by Letters Patent is:—

Variable speed gear of the epicyclic type comprising a driving and a driven shaft, a plurality of epicyclic gear trains adapted to provide a drive at different transmission ratios between said shafts, a brake member associated with each of the gear trains, a clutch adapted to engage the driving shaft with the driven shaft and thus provide a direct drive in high gear, selector members adapted to be moved in an axial direction and about their axes, a hand lever adapted to move axially said selector members to apply one or other of said brake members and unable as desired a driving connection through one or other of the gear trains to be obtained or to enable the clutch to be engaged for securing a drive in high gear, spring mechanism adapted to constrain the selector members to move about their axes in a given direction into the position to establish a driving connection, and a pedal adapted to move such selector members about their axes in the reverse direction to interrupt the driving connection and permit a change in the transmission ratio to be effected.

In testimony whereof I have signed my name to this specification.

JOHN ALGERTON FURNESS.